(12) United States Patent
Caroli

(10) Patent No.: US 7,299,600 B2
(45) Date of Patent: Nov. 27, 2007

(54) DEVICE FOR SEALING LENGTHS OF FILTER PAPER

(75) Inventor: Rodolfo Caroli, Imola (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 81 days.

(21) Appl. No.: 10/546,280

(22) PCT Filed: Jul. 15, 2004

(86) PCT No.: PCT/IB2004/002363

§ 371 (c)(1),
(2), (4) Date: Aug. 19, 2005

(87) PCT Pub. No.: WO2005/007513

PCT Pub. Date: Jan. 27, 2005

(65) Prior Publication Data

US 2006/0168910 A1  Aug. 3, 2006

(30) Foreign Application Priority Data

Jul. 21, 2003  (EP) .................................. 03425488

(51) Int. Cl.
*B65B 61/14* (2006.01)
(52) U.S. Cl. .................. 53/134.2; 53/128.1; 53/DIG. 2
(58) Field of Classification Search ............ 53/DIG. 2, 53/128.1, 133.5, 134.1, 134.2, 136.1, 285, 53/393; 156/379.6, 73.1
See application file for complete search history.

(56) References Cited

U.S. PATENT DOCUMENTS 3,551,260 A  12/1970  Catherwood
3,562,041 A * 2/1971  Robertson .................. 156/73.1
3,681,176 A * 8/1972  Reifenhauser et al. ... 156/580.2
3,939,033 A * 2/1976  Grgach et al. .............. 156/515

(Continued)

FOREIGN PATENT DOCUMENTS

DE      37 15 146 A1    12/1988

(Continued)

*Primary Examiner*—Rinaldi I. Rada
*Assistant Examiner*—Paul Durand
(74) *Attorney, Agent, or Firm*—Arent Fox LLP

(57) ABSTRACT

A device for sealing filter bags for products for infusion, where each filter bag is made from a flat web (1) of filter paper and has applied to it a tag (1*b*) and a tie string (1*a*) connecting the tag (1*b*) to the filter bag itself, comprises at least: a sealing sonotrode element (3) positioned so that it faces a first path (P) along which the flat web (1) is fed and so as to seal the string (1*a*), which is arranged according to a defined pattern, and the tags (1*b*) to each other and to the flat web (1) of filter paper'.; drive means (4) for imparting to the sealing sonotrode means (3) a defined motion towards and away from a sealing position; the drive means (4) in turn comprising first means (5) acted upon by the sealing sonotrode element (3) and designed to apply a predetermined force (F) to the sealing sonotrode element (3) itself; second means (6) for opposing the action of the first means (5), that is to say, for reducing its intensity, and third control means (7) for disabling the second means (6), during predetermined steps of passing the filter bag components under the sealing sonotrode element (3), so as to permit a predetermined sealing contact.

7 Claims, 2 Drawing Sheets

U.S. PATENT DOCUMENTS

| | | | | |
|---|---|---|---|---|
| 4,072,089 A | * | 2/1978 | Bosche | 493/164 |
| 4,145,236 A | * | 3/1979 | Neumayer et al. | 156/73.1 |
| 4,404,052 A | * | 9/1983 | Persson et al. | 156/73.1 |
| 4,433,527 A | * | 2/1984 | Ramsey et al. | 53/548 |
| 4,517,790 A | * | 5/1985 | Kreager | 53/552 |
| 4,681,645 A | * | 7/1987 | Fukushima et al. | 156/73.1 |
| 4,713,132 A | * | 12/1987 | Abel et al. | 156/73.1 |
| 4,784,591 A | * | 11/1988 | Ackermann | 425/116 |
| 4,880,651 A | * | 11/1989 | Christie | 426/394 |
| 5,421,924 A | * | 6/1995 | Ziegelhoffer et al. | 156/73.1 |
| 5,553,443 A | * | 9/1996 | St. Clair et al. | 53/450 |
| 5,667,608 A | | 9/1997 | Rajala et al. | |
| 5,890,347 A | * | 4/1999 | Giacomelli et al. | 53/477 |
| 5,934,043 A | * | 8/1999 | Aindow et al. | 53/371.4 |
| 5,948,208 A | * | 9/1999 | Speich | 156/580.2 |
| 5,989,370 A | * | 11/1999 | Wannebo | 156/73.1 |
| 6,592,711 B1 | * | 7/2003 | Kubik | 156/580.1 |
| 6,835,257 B2 | * | 12/2004 | Perrine | 156/73.1 |

FOREIGN PATENT DOCUMENTS

| | | |
|---|---|---|
| EP | 0 251 070 A2 | 1/1988 |
| EP | 0 916 476 A1 | 5/1999 |
| JP | 9-24907 | 1/1997 |
| WO | WO 2004/054880 A1 | 7/2004 |

\* cited by examiner

DEVICE FOR SEALING LENGTHS OF FILTER PAPER

CROSS-REFERENCE TO RELATED APPLICATION

This application is a National Stage entry of International Application Number PCT/IB2004/002363, filed Jul. 15, 2004. The disclosure of the prior application is hereby incorporated herein in its entirety by reference.

TECHNICAL FIELD

The present invention relates to a device for improving the control of sealing quality on lengths of filter paper.

We refer in particular to the sealing process performed in machines for making filter bags containing a product for infusion such as tea, camomile and the like.

BACKGROUND ART

In such machines, the open end of the filter bag must be sealed (after the product has been filled into the bag): sealing can be accomplished by any of several known methods, for example, using a staple or the string that joins the filter bag to the tag (by knotting the length of string itself or another piece of string) or by sealing the overlaid portions of the web of filter paper.

In the case of sealing, operations may be carried out by traditional sealing means with heating elements or, as in the solutions of the latest generation, by ultrasound devices that use sonotrodes placed in contact with the product to be sealed.

In practice, the sonotrode is the transducer element that converts the power supply into vibrations that are discharged onto the product to be sealed.

For example, one solution for this type of machine is disclosed in patent application BO2002A000798 by the same Applicant as the present.

In that solution, the apparatus for making filter bags for infusion products is equipped with a revolving conveyor drum driven by a first drive shaft to feed a web of filter paper along a path on which there are positioned: a station for feeding the filter paper web; a station for feeding a succession of tags; a station for feeding tie string connecting the filter bags to the respective tags; a station for arranging the tie string according to a defined pattern; and a plurality of sealers facing the feed path and designed to attach the tie string and the tags to the filter paper web. The sealers, which are sonotrodes, perform a defined movement between a sealing position and a waiting position, and this movement, which is performed simultaneously and synchronously by all the sealers, is imparted, through a transmission element shared by all the sealers, by a second cam drive shaft connected to the same source of motion to which the first shaft that drives the conveyor drum is connected.

In other words, the sonotrode is placed in a preferred position relative to the underlying part over which filter paper web moves, this preferred position depending on the inherent properties of the paper itself, on the speed at which it is fed and on the thickness of the components to be sealed (filter paper, tie string and tag) placed one over the other.

The Applicant has found that the relative position between the emitting surface of the sonotrode and the product supporting surface constitutes a fundamental variable for good sealing quality.

In practice, the constancy of sealing quality is directly proportional also to the force of the contact (besides contact time and the frequency of sonotrode activation) between the sonotrode and the product supporting surface, which means that the thrust force applied mist be as constant as possible. This is not always easy to achieve since the components to be sealed (described above) are not always exactly the same in thickness and their total thickness varies within quite a wide range: as a result, the pressure applied to the products that move into the sealing area (under the sonotrode) tends to vary from one product to the other, thus leading to irregular sealing quality.

The present invention therefore has for an object to overcome the above mentioned drawback through a device that enables the sealer sonotrode to apply a substantially constant contact force on the product to be sealed, the application of the force being synchronised with the presence of the product in the sealing area.

DISCLOSURE OF THE INVENTION

According to the invention, this object is achieved by a device for sealing filter bags for products for infusion comprising at least: a sealing sonotrode element positioned so that it faces a first path along which the flat web is fed and so as to seal the string, which is arranged according to a defined pattern, and the tags to each other and to the flat web of filter paper; drive means for imparting to the sealing sonotrode means a defined motion towards and away from a sealing position; the drive means in turn comprising first means acted upon by the sealing sonotrode element and designed to apply a predetermined force to the sonotrode sealing element itself; second means for opposing the action of the first means, that is to say, for reducing its intensity, and third control means for disabling the second means, during predetermined steps of passing the filter bag components under the sealing sonotrode element, so as to permit a predetermined sealing contact.

DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

DETAILED DESCRIPTION OF THE PREFERRED EMBODIMENTS OF THE INVENTION

Figure 1:
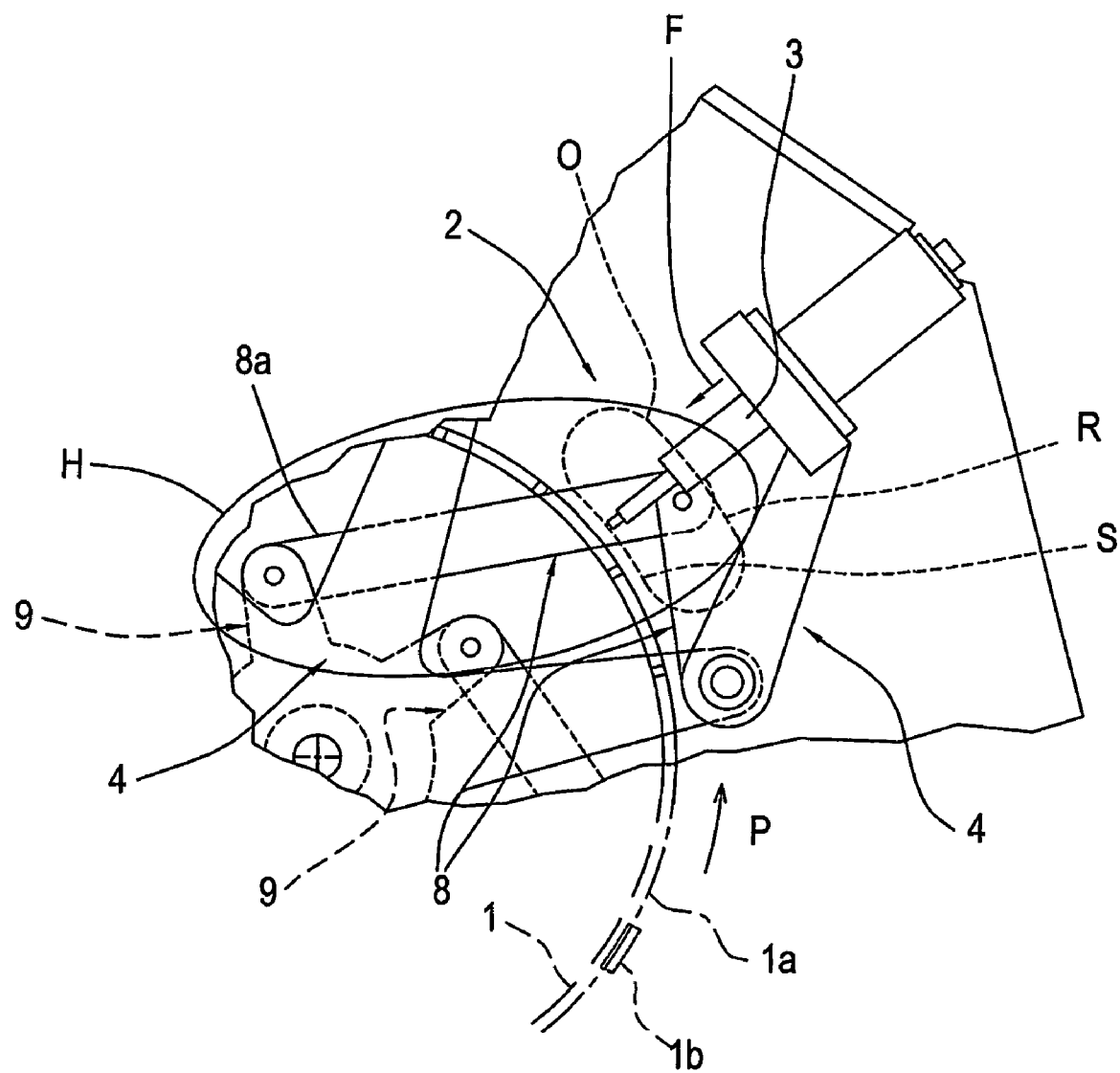
FIG. 1 is a partial side view, with some parts cut away to better illustrate others, of an apparatus for making filter bags for products for infusion equipped with the sealing device according to the present invention for wrapping groups of products with film.

With reference to the accompanying drawings, in particular FIG. 1, the device according to the invention is used to seal filter bags for products for infusion.

By way of example, each filter bag is made from a flat web 1 of filter paper (shown by the dashed line in FIG. 1) and has applied to it a tag and a tie string connecting the tag to the filter bag itself.

The device, denoted in its entirety by the numeral 2, may form part of a more complex machine for making the entire filter bags and filling them with product. Machines of this kind are very well known and will not be described here since they are described in detail in prior art, such as, for example, in patent application BO2002A000798 by the same Applicant as the present.

The device 2 essentially comprises:
- a sealer sonotrode 3 positioned so that it faces a first path P along which the flat web 1 is fed (see arrow P in FIG. 1) and so as to seal the string 1a, which is arranged according to a defined pattern, and the tags 1b to each other and to the flat web 1 of filter paper;
- drive means 4 for imparting to the sealer sonotrode 3 a defined motion towards and away from a sealing position.

Figures 2, 3:
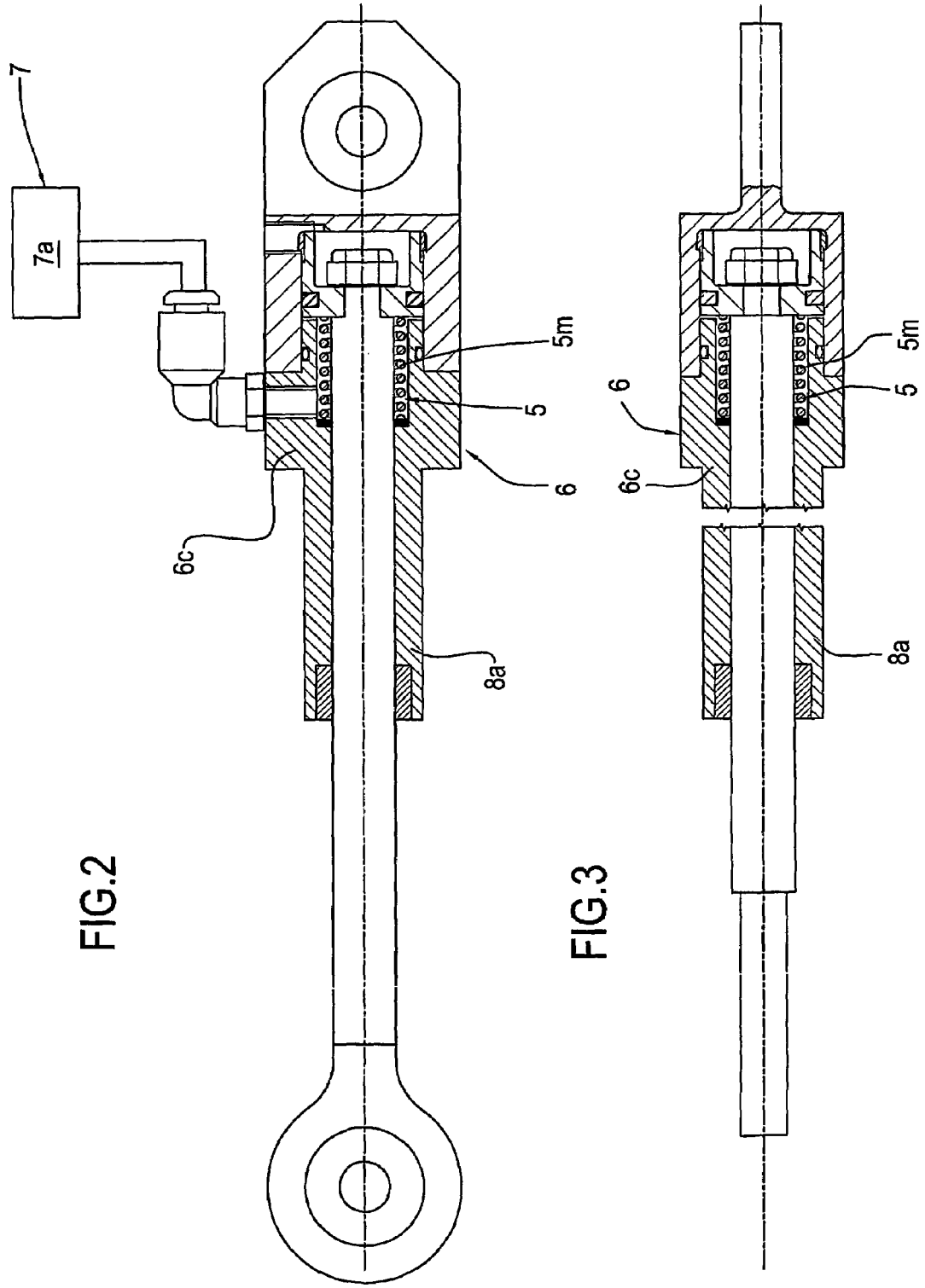
FIGS. 2 and 3 are, respectively, a side view and a front view, with some parts in cross section to better illustrate others, of a detail H of the device of FIG. 1.

As also illustrated in FIGS. 2 and 3, the drive means 4 comprise:
- first means 5 acted upon by the sealer sonotrode 3 and designed to apply a predetermined force F to the sealer sonotrode 3 itself (as indicated by the corresponding arrow in FIG. 1);
- second means 6 for opposing the action of the first means 5, that is to say, for reducing its intensity;
- third control means 7 for disabling the second means 6 during predetermined steps of passing the filter bag components under the sealing sonotrode element 3, so as to permit a predetermined sealing contact.

More specifically, in a preferred embodiment, the means 4 for driving the sealer sonotrode 3 may comprise a four-point linkage 8 driven by cam means 9 (partially illustrated in FIG. 1) designed to move the working end of the sealer sonotrode 3 along a respective second closed path C comprising a sealing section S that substantially coincides with the first path P, and a return section R extending outside the first path P.

In this specific case, the first and second means 5 and 6 define a part of the four-point linkage 8.

Looking in more detail (again with reference to FIGS. 2 and 3), the first means 5 may consist of elastic means comprising a helical spring 5m positioned on one of the arms 8a of the four-point linkage 8.

The second means 6 may consist of a pneumatic cylinder 6c (for example, of the single acting type) defining the arm 8a of the four-point linkage 8 linked at one end to the sonotrode sealer 3 and at the other to the cam means 9.

The cylinder 6 houses the helical spring 5m defining the first means 5 in such a way as to interact with the spring when the sealer sonotrode 3 moves along the aforementioned sections of its path.

The aforementioned third control means 7 may comprise a unit 7a for charging and discharging fluid under pressure (for example air) into and out of the pneumatic cylinder 6c in such a way as to vary the intensity of the force F applied to the sealer sonotrode 3 according to the section of the second path C the sealer sonotrode 3 is moving along.

In other words, the air is discharged from the cylinder 6c (so that only the load F of the spring 5m, with a slight spring overtravel, is applied) when the sealer sonotrode 3 is moving along the sealing section S whilst the cylinder 6c is charged with air during the idle, return section R of the path.

It will be understood that the invention can be modified and adapted in several ways without thereby departing from the scope of the inventive concept. Moreover, all the details of the invention may be substituted by technically equivalent elements.

The invention claimed is:

1. A device for sealing filter bags for products for infusion, each filter bag being made from a flat web of filter paper and having applied to it a tag and a tie string connecting the tag to the filter bag, the device comprising:
   - a sealer sonotrode facing a first path along which the flat web is fed to seal the string, which is arranged according to a defined pattern, and the tag to each other and to the flat web of filter paper;
   - drive means for imparting to the sealer sonotrode a defined motion towards and away from a sealing position, the drive means comprising:
     - first means acted upon by the sealer sonotrode and designed to apply a predetermined force to the sealer sonotrode;
     - second means for opposing the force of the first means and reducing an intensity thereof; and
     - third means for disabling the second means during predetermined steps of passing the filter bag components under the sealing sonotrode element, and permitting a predetermined sealing contact,
   - wherein the first and second means define a part of a four-point linkage.

2. The device according to claim 1, wherein the four-point linkage is driven by cam means designed to move a working end of the sealer sonotrode along a respective second closed path comprising a sealing section that substantially coincides with the first path, and a return section extending outside the first path.

3. The device according to claim 1 or 2, wherein the first means are elastic means.

4. The device according to claim 3, wherein the four-point linkage includes an arm, and wherein the elastic means comprises a helical spring positioned on the arm of the four-point linkage.

5. The device according to claim 2, wherein the four-point linkage includes an arm, and wherein the second means includes a pneumatic cylinder defining the arm of the four-point linkage linked at a first end to the sealer sonotrode and at a second end to the cam means.

6. The device according to claim 2, wherein the four-point linkage includes an arm, and wherein the second means includes a pneumatic cylinder defining the arm of the four-point linkage linked at a first end to the sealer sonotrode and at a second end to the cam means, and wherein a cylinder houses the first means, the cylinder housing the first means comprises a helical spring.

7. The device according to claim 5 or 6, wherein the third control means comprises a unit for charging and discharging a fluid under pressure into and out of the pneumatic cylinder to vary the intensity of the force applied to the sealer sonotrode while moving along a section of the second closed path.

* * * * *